:::

United States Patent
Huang et al.

(10) Patent No.: US 9,534,588 B2
(45) Date of Patent: Jan. 3, 2017

(54) GRAVITY-ASSISTED ROTATIONAL MECHANISM AND GENERATOR DEVICE COOPERATING THEREWITH

(71) Applicants: Ting Yen Huang, Taipei (TW); Cheng Chieh Huang, Taipei (TW); Cheng Hsiang Huang, Taipei (TW)

(72) Inventors: Ting Yen Huang, Taipei (TW); Cheng Chieh Huang, Taipei (TW); Cheng Hsiang Huang, Taipei (TW)

( * ) Notice: Subject to any disclaimer, the term of this patent is extended or adjusted under 35 U.S.C. 154(b) by 0 days.

(21) Appl. No.: 14/509,158

(22) Filed: Oct. 8, 2014

(65) Prior Publication Data

US 2015/0021923 A1    Jan. 22, 2015

Related U.S. Application Data

(63) Continuation-in-part of application No. 13/744,797, filed on Jan. 18, 2013, now abandoned.

(51) Int. Cl.
| | |
|---|---|
| *F03G 3/00* | (2006.01) |
| *H02K 53/00* | (2006.01) |
| *A63H 33/00* | (2006.01) |
| *A63H 1/18* | (2006.01) |
| *F03G 7/10* | (2006.01) |
| *A63H 33/26* | (2006.01) |

(52) U.S. Cl.
CPC ...... *F03G 3/00* (2013.01); *A63H 1/18* (2013.01); *A63H 33/00* (2013.01); *H02K 53/00* (2013.01); *A63H 33/26* (2013.01); *F03G 7/10* (2013.01); *Y10S 74/09* (2013.01)

(58) Field of Classification Search
CPC ............... F03G 3/00; F03G 7/10; A63H 1/18; A63H 33/00; H02K 53/00; Y10S 74/09
See application file for complete search history.

(56) References Cited

U.S. PATENT DOCUMENTS

| | | | |
|---|---|---|---|
| 2008/0174121 A1* | 7/2008 | Wattenbarger | F03G 3/00 290/1 R |
| 2010/0175502 A1* | 7/2010 | Siriphant | F03G 3/00 74/572.1 |
| 2011/0198859 A1* | 8/2011 | Huang | A63H 1/18 290/1 C |
| 2013/0127177 A1* | 5/2013 | Huang | F03G 3/00 290/1 C |

(Continued)

*Primary Examiner* — Viet Nguyen
(74) *Attorney, Agent, or Firm* — Rosenberg, Klein & Lee (57) ABSTRACT

A gravity-assisted rotational mechanism and a generator device cooperating therewith. The gravity-assisted rotational mechanism includes multiple concentric rotational members having different sizes and rotatable about the same rotational center, several link members having equal weights for driving the same, and at least one connection member for pivotally connecting the rotational members with the link members. The rotational members can symmetrically push/pull each other. The link members and connection member are respectively mounted on interference sections of at least some of the rotational members to absorb gravitational energy. The energy of the link members is transmitted via the interference sections to the rotational members to form a cycle of energy storage and transmission. The generator device serves to convert the gravitational energy and minimize the rotational inertia loss and increase yield rate of electrical energy.

38 Claims, 8 Drawing Sheets

(56) References Cited

U.S. PATENT DOCUMENTS

2015/0040717 A1* 2/2015 Miyagawa ............. H02K 7/025
  74/572.11
2015/0260168 A1* 9/2015 Geneste ................... F03G 3/00
  60/517

* cited by examiner

GRAVITY-ASSISTED ROTATIONAL MECHANISM AND GENERATOR DEVICE COOPERATING THEREWITH

CROSS-REFERENCE TO RELATED APPLICATION

This application is a continuation-in-part application of U.S. patent application Ser. No. 13/744,797, filed 18 Jan. 2013, currently pending.

BACKGROUND OF THE INVENTION

1. Field of the Invention

The present invention relates generally to a gravity-assisted rotational mechanism and a generator device cooperating therewith. The gravity-assisted rotational mechanism has precisely designed weight arrangement. After an initial force is applied to the gravity-assisted rotational mechanism to make it rotate, the gravity-assisted rotational mechanism has energy fully converted from gravity so as to reduce rotational energy loss.

2. Description of the Related Art

A conventional decorative or entertaining self-rotating article such as a top or a bamboo dragonfly is manually driven to swivel so as to achieve visual effect and entertaining or educational or other added function. However, the self-rotating article will contact the ground or air and gradually turn from a fast rotating state to a still state due to friction. The lasting time of the rotation of the article varies with the article's own configuration and weight arrangement.

The so-called "Newton's cradle" is another often seen decoration working in the Law of Conservation of Energy. A Newton's cradle includes multiple metal balls suspended from a rack via strings. The metal balls are originally still and arranged side by side. When a first metal ball is lifted and then released and dropped to hit a second metal ball, the kinetic energy is sequentially transmitted from the second metal ball to a last metal ball. At this time, the last metal ball bounds up to transform the kinetic energy into potential energy. The conversion between the kinetic energy and the potential energy is repeated, whereby the Newton's cradle can lastingly operate.

The above self-rotating mechanism or decoration is driven by external force or operate in the Law of Conservation of Energy. The above decorations can be modified to have longer operation time and wider application range. For example, in condition of minimum energy loss or full conversion of other energy during operation, the self-rotating article can operate more lastingly in different pattern to achieve more novel and funny visual effect. In addition, by means of the ingenious energy conversion during rotation, a generator device can be provided to generate power at higher electrical energy yield rate and lower loss.

SUMMARY OF THE INVENTION

It is therefore a primary object of the present invention to providea gravity-assisted rotational mechanism and a generator device cooperating therewith.

To achieve the above and other objects, the gravity-assisted rotational mechanism includes multiple concentric rotational members having different sizes and rotatable about the same rotational center, several link members having equal weights for driving the same, and at least one connection member for pivotally connecting the rotational members with the link members. The rotational members can symmetrically push/pull each other. The link members and the connection member are respectively mounted on interference sections of at least some of the rotational members to transform the interference. The energy of the link members is transmitted via the interference sections to the rotational members and the connection member to form a cycle of energy transmission and convert the energy coming from gravity during the cycle so as to minimize energy loss.

In the gravity-assisted rotational mechanism, the torque applied to the rotational members varies with the distances between the rotational members and the rotational shaft. Especially, a forward force helpful to the rotation is applied to the rotatable member of the rotational mechanism to produce forward torque. The backward force that may resist against the rotation is applied to the rotational center of the entire rotational mechanism so as not to produce backward torque. Therefore, the energy loss of the backward rotational torque is minimized, whereby the total rotational amount of the rotatable member of the entire rotational mechanism is increased. In a preferred embodiment, the gravity-assisted rotational mechanism includes four metal rings with different sizes. The four metal rings are concentrically arranged. When the weight of a link member is applied to the rotational members, a larger torque is applied to the rotational member that has a larger size and is spaced from the rotational shaft by a longer distance. This helps the gravity-assisted rotational mechanism to revolve in a direction of the torque applied to the larger rotational member. Accordingly, at least one assembly of symmetrical link member and connection member is arranged around the concentric rotational members and the torque directed in the rotational direction of the rotational mechanism is all larger than the backward rotational torque, whereby the backward rotation is reduced so as to lower the power loss.

The generator device cooperating with the gravity-assisted rotational mechanism is able to effectively convert the energy for prolonging the rotational operation time of the gravity-assisted rotational mechanism so as to increase the electrical energy yield rate.

The present invention can be best understood through the following description and accompanying drawings, wherein:

DETAILED DESCRIPTION OF THE PREFERRED EMBODIMENTS

Figure 1:
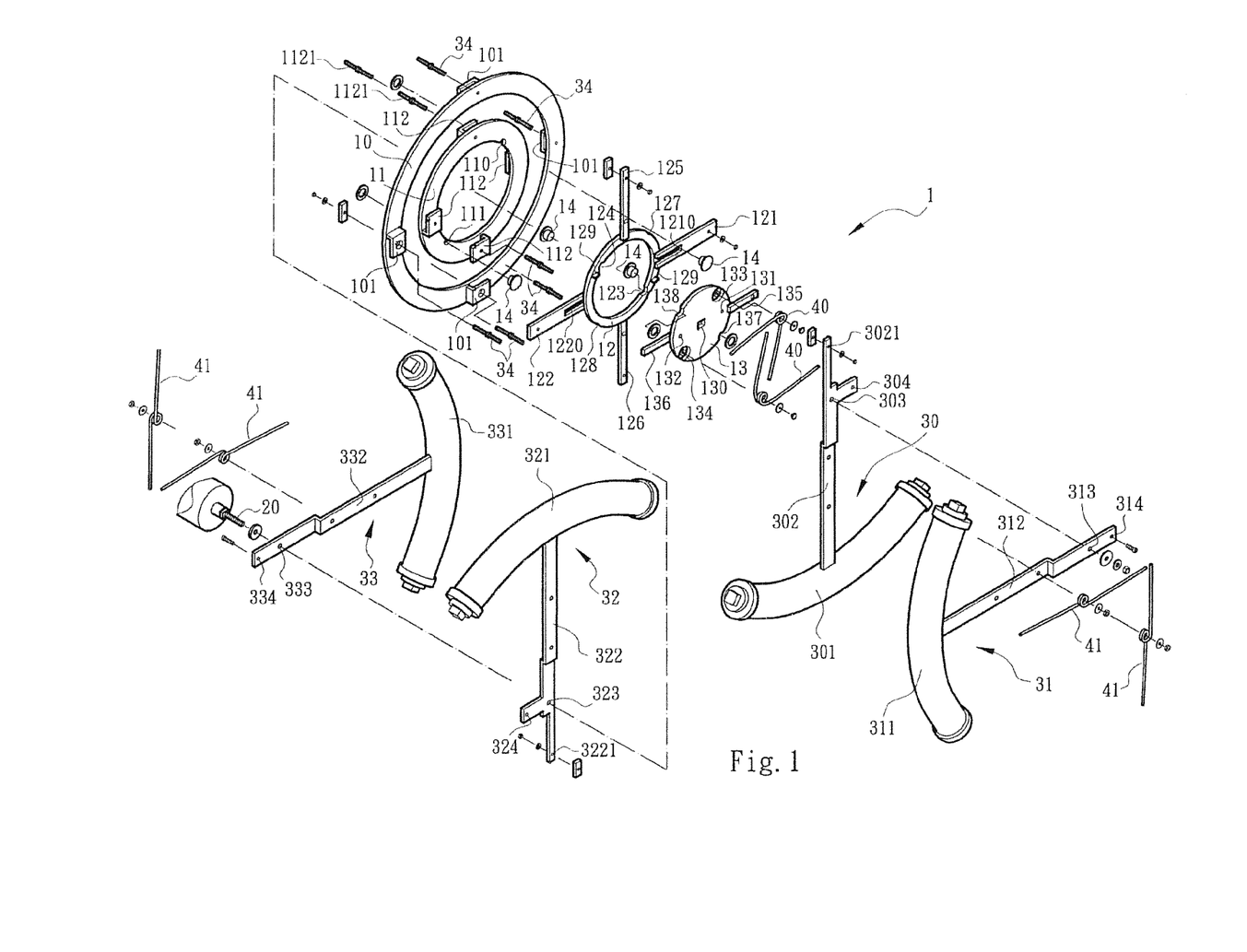
FIG. 1 is a perspective exploded view of the present invention.
Figure 2:
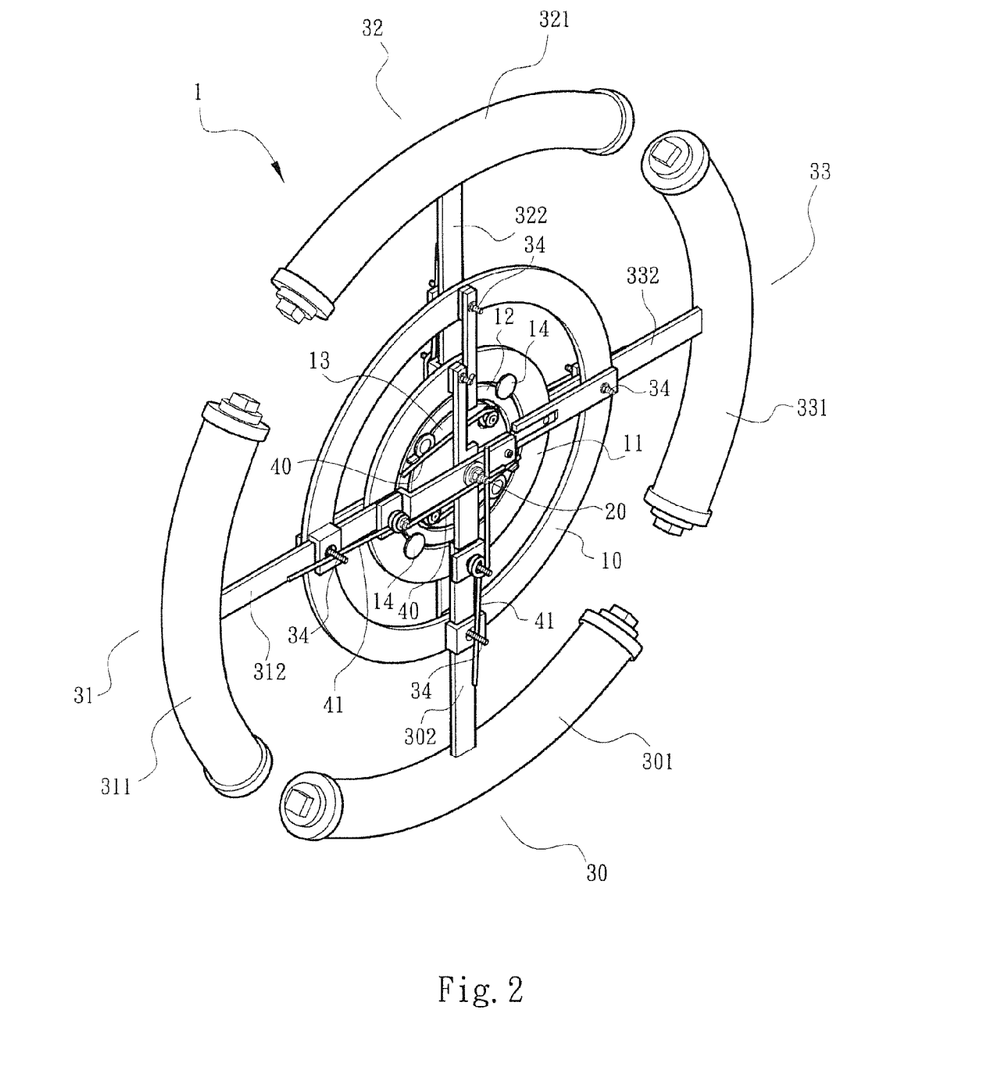
FIG. 2 is a perspective assembled view of the present invention.
Figure 3:
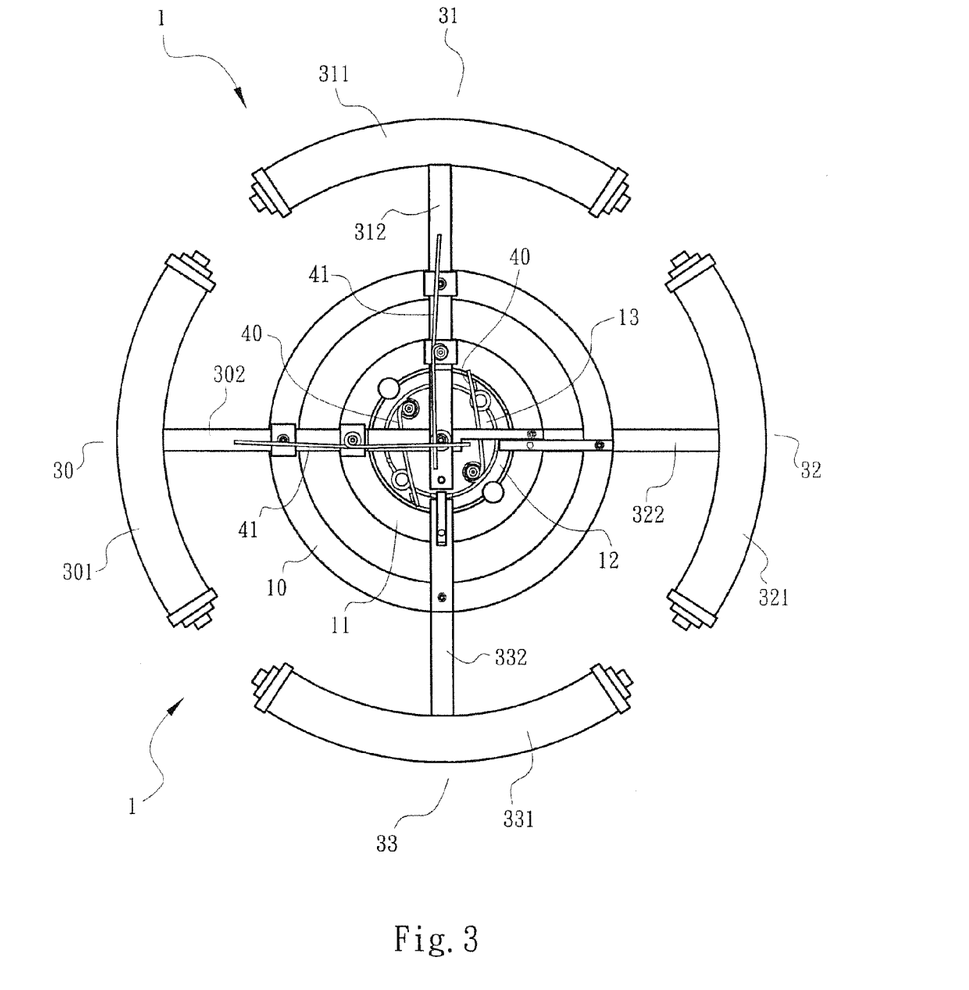
FIG. 3 is a front assembled view of the present invention.
Figure 4:
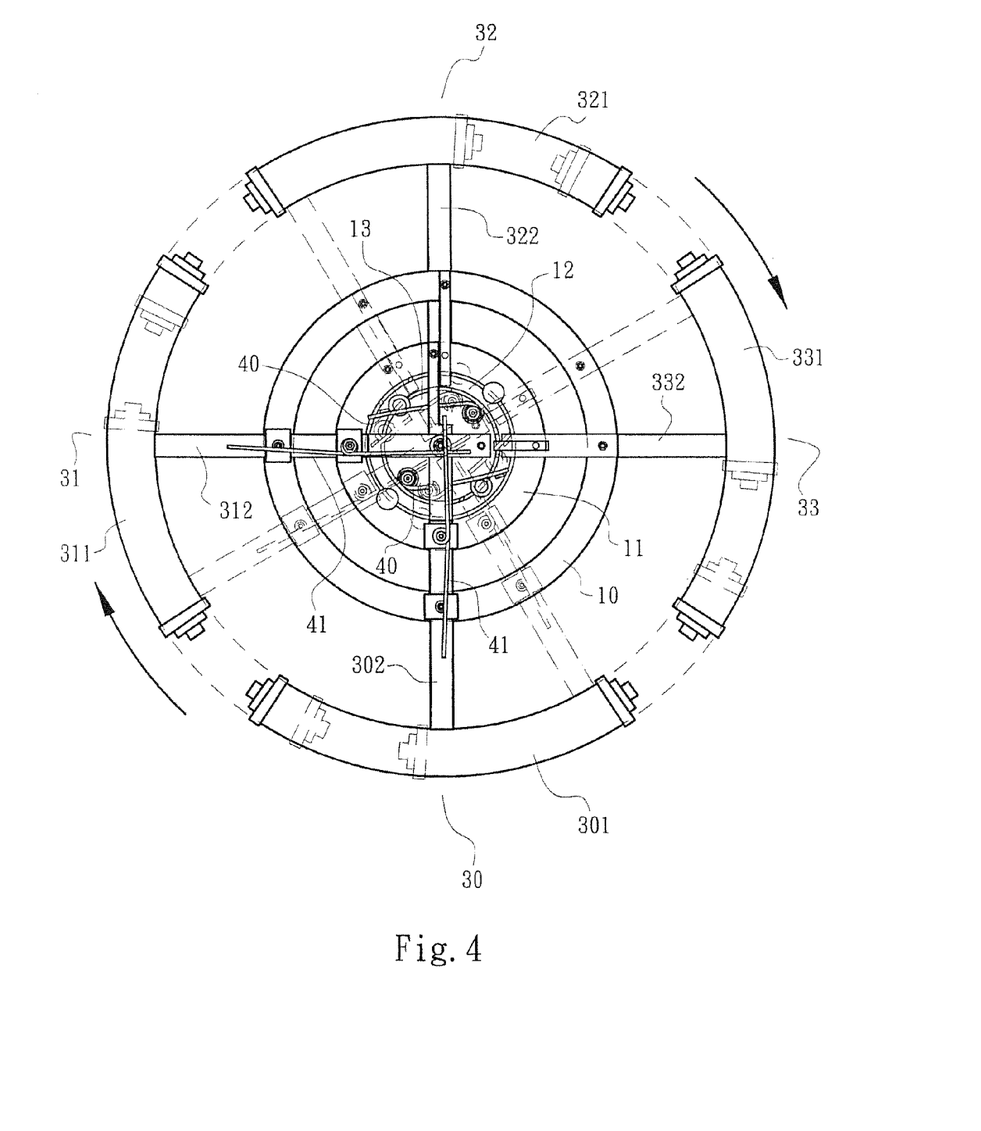
FIG. 4 is a front view according to FIG. 3, showing the operation of the present invention.

Please refer to FIGS. 1 to 3. The gravity-assisted rotational mechanism 1 of the present invention includes a first rotational ring 10, a second rotational ring 11, a third rotational ring 12 and a rotational disc 13, which are rotatable about the same rotational center or shaft 20. The gravity-assisted rotational mechanism 1 of the present invention further includes at least two link members 30, 31, 32, 33 connecting with the first, second and third rotational rings 10, 11, 12 and the rotational disc 13. The rotational disc 13 has a smallest diameter. The third rotational ring 12 is positioned around the rotational disc 13. The second rotational ring 11 is positioned around the third rotational ring 12, while the first rotational ring 10 is further positioned around the second rotational ring 11. The link members are symmetrically arranged at at least 180 degree intervals and connected between the above rotational members.

The rotational disc 13 is formed with a central hole 130 in which the rotational center or shaft 20 is drivingly fitted. The rotational disc 13 is further formed with first pivot points 131, 132, which are symmetrically arranged opposite to each other. The rotational disc 13 is further formed with symmetrical pivotal fitting sections 133, 134. The rotational disc 13 is further provided with symmetrically outward extending first guide plates 135, 136. An outer circumference of the rotational disc 13 is formed with first engagement sections 137, 138. The third rotational ring 12 is provided with symmetrically oppositely outward extending second guide plates 121 corresponding to the first guide plates 135, 136. The third rotational ring 12 is further formed with second engagement sections 123, 124 corresponding to the first engagement sections 137, 138. The third rotational ring 12 is further provided with outward extending connection plates 125, 126, which are spaced from the second guide plates 121, 122 by a certain angle. An outer circumference of the third rotational ring 12 is formed with third engagement sections 127, 128. Several push/pull sections 129 are disposed on one face of the third rotational ring 12. The second guide plates 121, 122 are formed with insertion slots 1210, 1220 in which the first guide plates 135, 136 are inserted and received.

An inner circumference of the second rotational ring 11 is formed with fourth engagement sections 110, 111 corresponding to the third engagement sections 127, 128. Multiple first interference sections 112 are disposed on two faces of the second rotational ring 11 to provide supporting force in a first rotational direction. In this embodiment, the first interference sections 112 are L-shaped plates bent in one single direction.

Multiple second interference sections 101 are disposed on two faces of the first rotational ring 10 corresponding to the first interference sections 112 to provide supporting force in a second rotational direction reverse to the first rotational direction. The number of the second interference sections 101 is equal to that of the first interference sections 112. The second interference sections 101 can have the form as the first interference sections 112.

According to the above arrangement, the first guide plates 135, 136 of the rotational disc 13 are inserted in the insertion slots 1210, 1220 of the second guide plates 121, 122. The free ends of the first guide plates 135, 136 are pivotally connected on the second rotational ring 11. The free ends of the second guide plates 121, 122 of the third rotational ring 12 are pivotally connected on the first rotational ring 10. The free ends of the connection plates 125, 126 are also pivotally connected on the first rotational ring 10. The engagement sections 110, 111, 127, 128, 123, 124, 137, 138 are engaged with each other by means of engagement members 14.

Each of the link members 30, 31, 32, 33 is composed of a link bar 302, 312, 322, 332 and a weight body 301, 311, 321, 331 connected with an outer end of the link bar. Weight materials can be placed in the weight bodies 301, 311, 321, 331 to micro-adjust the weight thereof. The weight bodies 301, 311, 321, 331 are assembled with the rotational members and substantially positioned around the first rotational ring 10. The link bars 302, 312, 322, 332 are formed with through holes 303, 313, 323, 333 near inner ends of the link bars 302, 312, 322, 332 corresponding to the rotational center or shaft 20 for pivotally connecting the link bars 302, 312, 322, 332 with the rotational center or shaft 20. In addition, the link bars 302, 312, 322, 332 are respectively formed with stabilization points 304, 314, 324, 334 for pivotally connecting with the first pivot points 131, 132 of the rotational disc 13. The inner ends of some symmetrical link bars 302, 322 additionally have outward extending sections 3021, 3221 for pivotally connecting with the second rotational ring 11. Moreover, different sections of the link bars 302, 312, 322, 332 are respectively restricted within the first and second interference sections 112, 101. Multiple rod-shaped restriction members 34 are loosely fitted through the second interference sections 101 and affixed to the link bars 302, 312, 322, 332. The rod-shaped restriction members 34 are further fixedly fitted through the first interference sections 112.

In a preferred embodiment, in order to keep the positional relationship between the respective components of the gravity-assisted rotational mechanism 1 in a good stabilized state in operation, multiple elastic members 40, 41 are provided between the pivotal fitting sections 133, 134 of the rotational disc 13 and the push/pull sections 129 of the third rotational ring 12 and between the restriction members 34 and the rotational center or shaft 20. The elastic members 40, 41 serve to provide elastic push effect to eliminate the loosening of the respective components and the gaps therebetween so as to stabilize the operation of the gravity-assisted rotational mechanism 1. In addition, the elastic push effect relationship between the elastic members 40 is such that the rotational center thereof acts on the pivotal fitting sections 133, 134 of the rotational disc 13 and the two free swing ends respectively act on the rotational center or the rotational shaft 20 and the push/pull sections 129 of the third rotational ring 12. During rotation, one of the two free swing ends elastically acts on the rotational center or rotational shaft 20 nearly without any effect to the forward and backward rotation. The other of the two free swing ends provides rotational assistant force for the third rotational ring 12. Similarly, the elastic members 41 acting on the restriction members 34 and the rotational center or shaft 20 serve to provide rotational assistant force for the first rotational ring 10 during rotation to enhance the ability to continuously rotate. The rotational resistance of the front and rear elastic members 40, 41 is minimized to smoothen the rotation.

Figure 5:
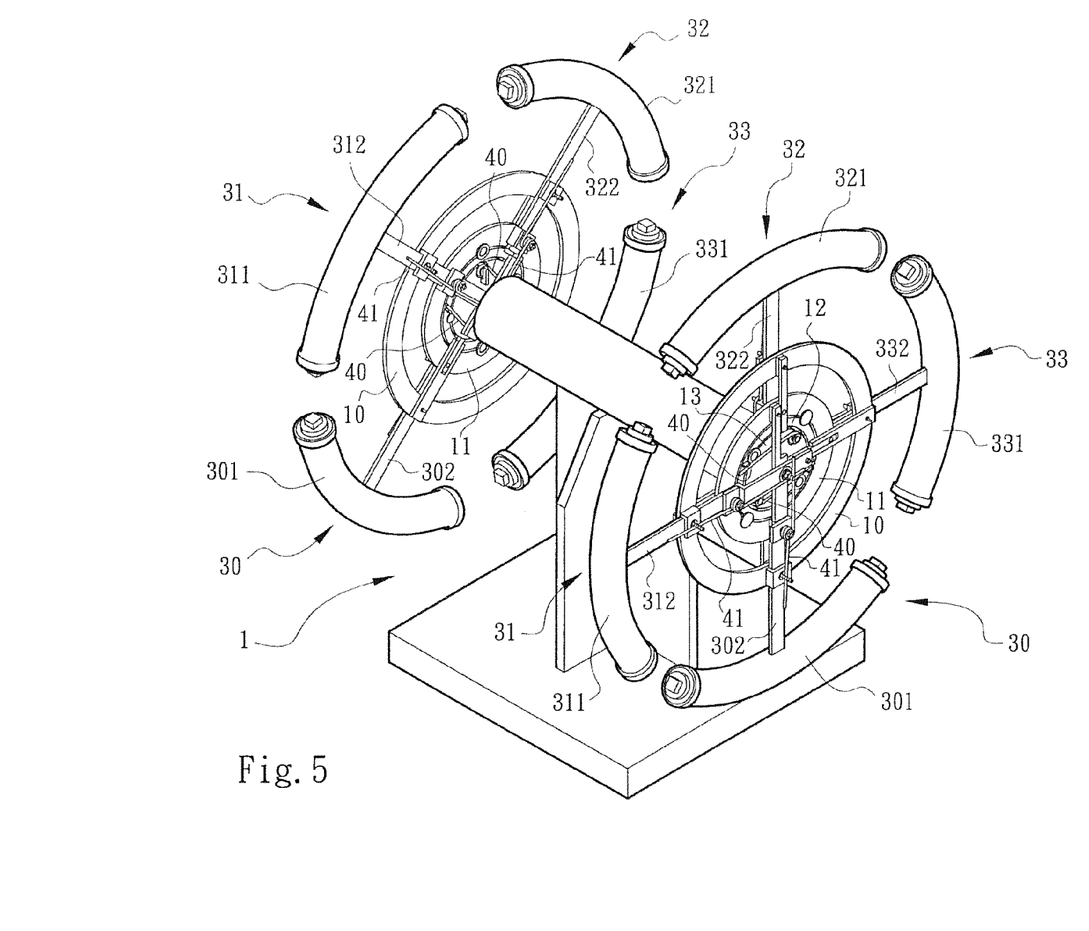
FIG. 5 is a perspective view of the present invention, showing that two gravity-assisted rotational mechanisms are assembled with the same rotational center or shaft with an angle difference.

Please refer to FIG. 5. In a preferred embodiment of the present invention, two gravity-assisted rotational mechanisms are assembled with the same rotational center or shaft 20 with an angle difference. In this case, the rotational inertia can be more smoothly continued.

Figure 6:
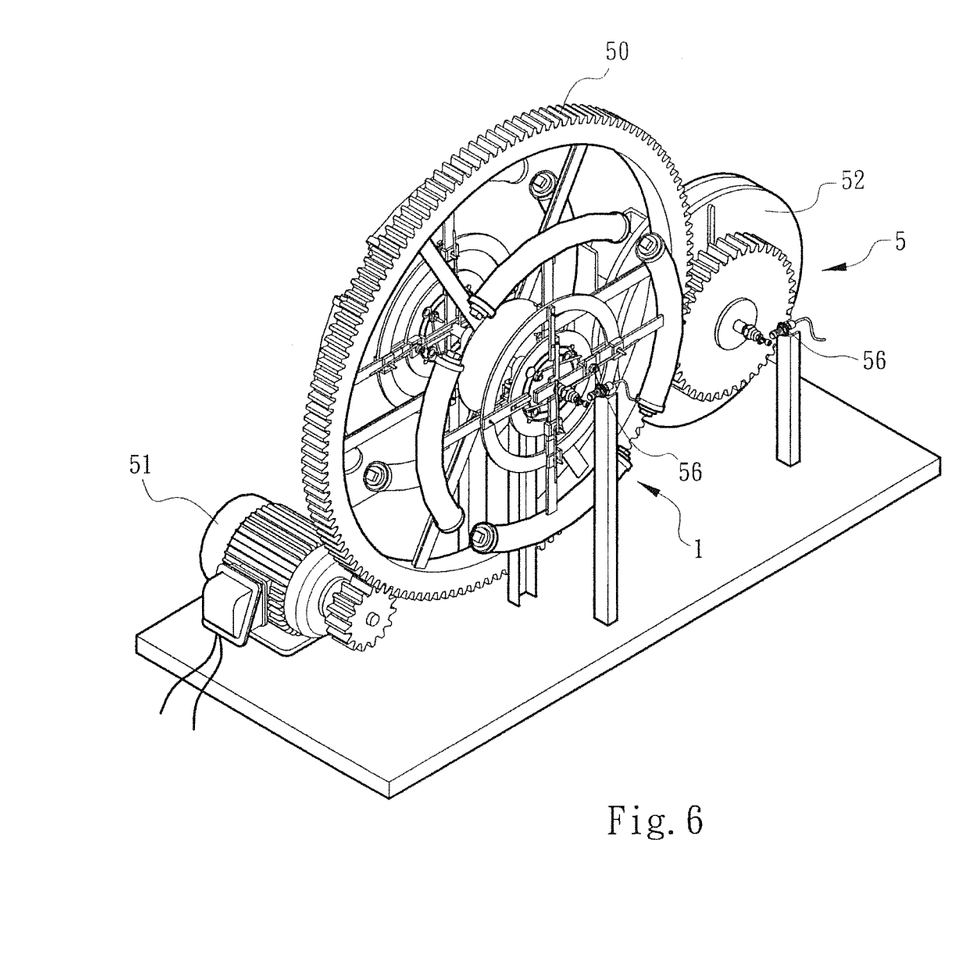
FIG. 6 is a perspective view showing that a generator device is connected to the rotational shaft of the present invention.
Figure 7:
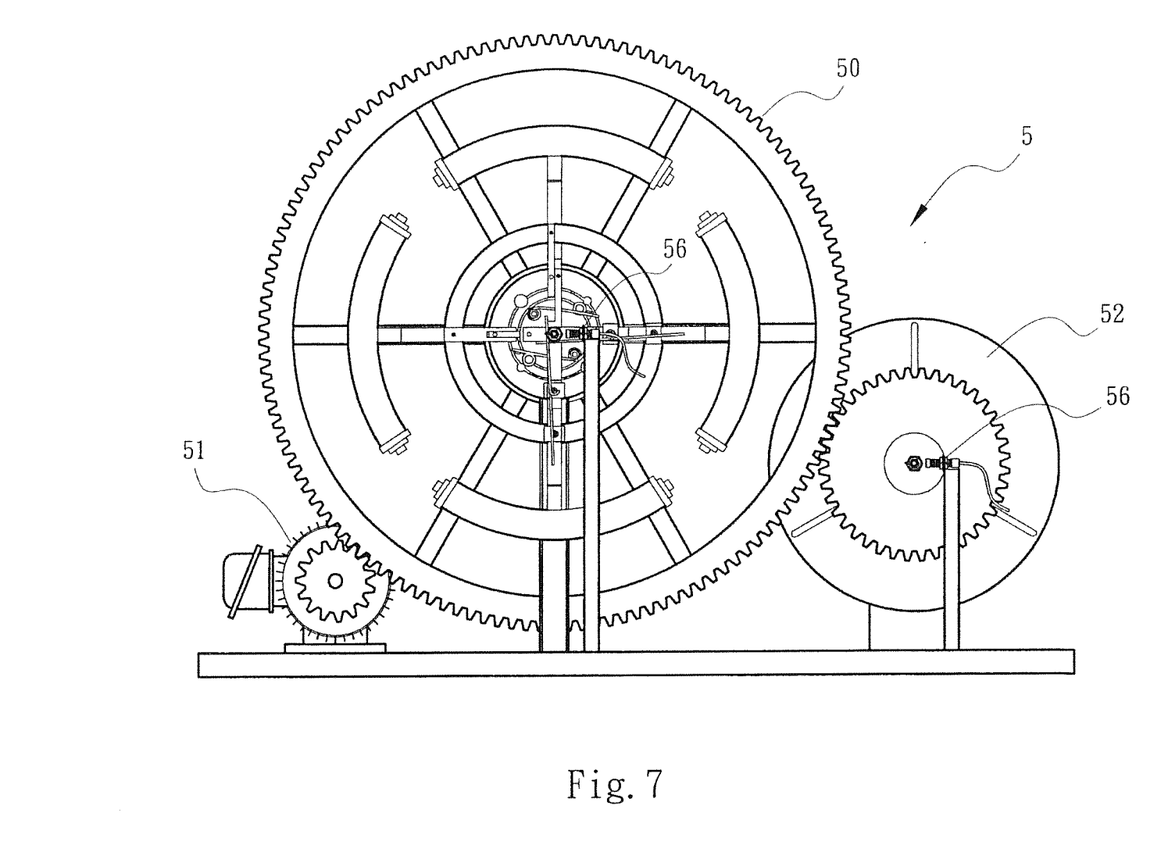
FIG. 7 is a plane view according to FIG. 6.
Figure 8:
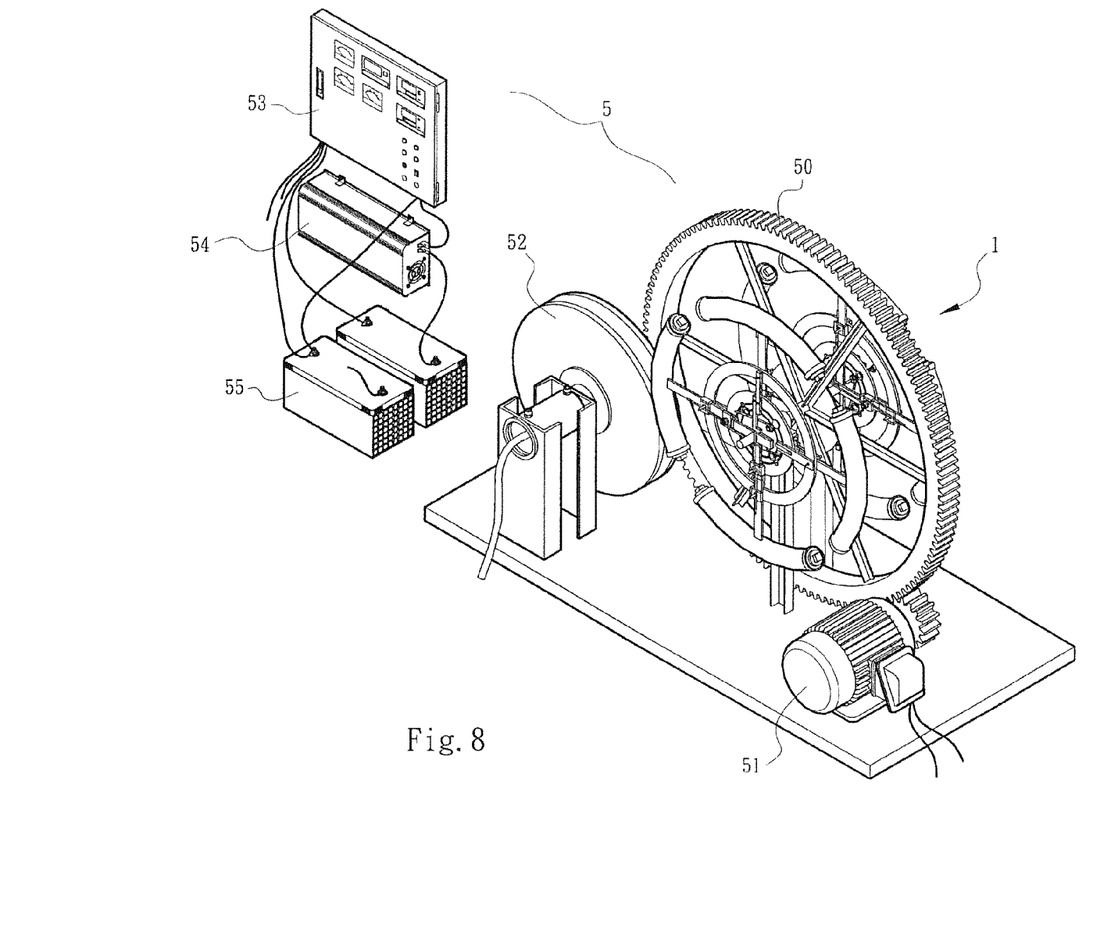
FIG. 8 is a perspective view according to FIG. 6, showing that a power storage device is further connected to the generator.

Please now refer to FIGS. 6 to 8. A working device or a generator device 5 can be further connected to the rotational center or shaft 20, whereby the generator device 5 can fully utilize the gravity-assisted rotational mechanism to reduce the loss and convert the energy into electrical energy so as to save energy. The generator device 5 includes a coupling wheel (or gear) 50 mounted on the rotational center or shaft 20. The coupling wheel 50 is coupled with an actuation device 51 (such as a motor) and a coupling section of a generator 52. The generator 52 is further coupled with an electrical control device 53, which is electrically connected to an electrical conversion device 54 (such as a rectifier or a transformer) and a power storage device 55 (such as a battery). The power storage device 55 can further provide electrical energy to external devices or the actuation device 51 via the electrical conversion device 54. Sensors 56 are disposed at the rotational center or shaft 20 and the central rotary shaft 522 of the generator 52 for measuring the rotational speed to turn on the actuation device 51 again in proper time and keep an optimal rotational speed for power generation. The power storage device 55 or an external energy source or prime mover can supply necessary energy for the actuation device 51.

In order to ensure the function of the gravity-assisted rotational mechanism of the present invention, the applicant has further performed a test on Oct. 25, 2013. According to the design content of the present invention, a sample device is manufactured. In addition, Taiwan Test Technologies Co., Ltd. has issued a SGS test certificate (as the Attachment) on behalf of the applicant. A "flywheel circulation power generation" SGS test report has been completed. It is found from the content of the test report that the flywheel device manufactured according to the content of the present invention is connected with a 7½ HP motor for inputting power to drive the flywheel device. In addition, a 50 KW generator is driven by the flywheel device to generate power and supply power via a stabilizer and a current transformer. When the motor is powered on by a civil power input power 0.5 (KW), the generator can be driven to output power of 14.3(KW). Alternatively, when a battery supplies a power of 1.3(KW) for the input end to drive the motor, the generator can be driven to output power of 16.3(KW). The detailed relevant data are shown in the test result data tables G.2.2.1 and G.2.2.2 of Attachment 2. The test results prove that the present invention truly can enhance the power generation efficiency.

The above embodiments are only used to illustrate the present invention, not intended to limit the scope thereof. Many modifications of the above embodiments can be made without departing from the spirit of the present invention.

What is claimed is:

1. A gravity-assisted rotational novelty system comprising at least two concentric rotational members having different sizes and rotatable about the same rotational center or shaft, and at least one pair of link members connected between the above concentric rotational members, interference sections being at least disposed on a large-size rotational member and a small-size rotational member in different rotational directions, the link members being restricted within the interference sections, the interference sections of the large-size rotational member serving to provide supporting force for the link members that rotate and descend, while the interference sections of the small-size rotational member serving to provide supporting force for the link members that rotate and ascend, wherein the rotational members include a first rotational ring, a second rotational ring, a third rotational ring and a rotational disc, which are concentric with decreasing sizes, each of the link members being composed of a link bar and a weight body connected with the link bar, the interference sections disposed on the first rotational ring being second interference sections, the interference sections disposed on the second rotational ring being first interference sections, the weight bodies being arranged around the first rotational ring, the link bars being formed with through holes near inner ends of the link bars for pivotally connecting the link bars with the rotational center or shaft, the link bars being further respectively formed with stabilization points for pivotally connecting with first pivot points of the rotational disc, the link bars being restricted within different interference sections of the rotational members; and wherein the rotational mechanism further includes a coupling wheel mounted on the rotational center or shaft, the coupling wheel being coupled with an actuation device and a generator.

2. The gravity-assisted rotational mechanism as claimed in claim 1, wherein the inner ends of the link bars additionally have outward extending sections for pivotally connecting with the second rotational ring.

3. The gravity-assisted rotational mechanism as claimed in claim 1, wherein the rotational disc is formed with a central hole in which the rotational center or shaft is drivingly fitted, the rotational disc, the third rotational ring and the second rotational ring being engaged with each other.

4. The gravity-assisted rotational mechanism as claimed in claim 3, wherein the rotational members are formed with engagement sections, which are engaged with each other by means of engagement members.

5. The gravity-assisted rotational mechanism as claimed in claim 1, wherein the rotational disc has at least two symmetrically outward extending first guide plates, free ends of the first guide plates being pivotally connected on the second rotational ring.

6. The gravity-assisted rotational mechanism as claimed in claim 5, wherein the third rotational ring has symmetrically oppositely outward extending second guide plates corresponding to the first guide plates, the second guide plates being formed with insertion slots in which the first guide plates are inserted, free ends of the second guide plates being pivotally connected on the first rotational ring.

7. The gravity-assisted rotational mechanism as claimed in claim 5, wherein the third rotational ring further has symmetrically oppositely outward extending connection plates, free ends of the connection plates being pivotally connected on the first rotational ring.

8. The gravity-assisted rotational mechanism as claimed in claim 5, wherein push/pull sections are disposed on the third rotational ring and pivotal fitting sections are disposed on the rotational disc, whereby when the third rotational ring is assembled with the rotational disc, two free swing ends of an elastic member respectively act on the rotational center or rotational shaft and the push/pull sections, a middle section of the elastic member being pivotally fitted on the pivotal fitting sections.

9. The gravity-assisted rotational mechanism as claimed in claim 5, wherein different sections of the link bars are respectively restricted within the first and second interference sections, restriction members being loosely fitted through the second interference sections and affixed to the link bars, elastic members being pivotally mounted between the restriction members and the rotational center or shaft, first ends and second ends of the elastic members respectively acting on the restriction members and the rotational center or shaft.

10. The gravity-assisted rotational mechanism as claimed in claim 5, wherein multiple rotational mechanisms each of which is composed of the rotational members and the link members are mounted on the rotational center or shaft.

11. The gravity-assisted rotational mechanism as claimed in claim 1, wherein the third rotational ring has symmetrically oppositely outward extending second guide plates, free ends of the second guide plates being pivotally connected on the first rotational ring.

12. The gravity-assisted rotational mechanism as claimed in claim 11, wherein the third rotational ring further has symmetrically oppositely outward extending connection plates, free ends of the connection plates being pivotally connected on the first rotational ring.

13. The gravity-assisted rotational mechanism as claimed in claim 11, wherein different sections of the link bars are respectively restricted within the first and second interference sections, restriction members being loosely fitted through the second interference sections and affixed to the link bars, elastic members being pivotally mounted between the restriction members and the rotational center or shaft, first ends and second ends of the elastic members respectively acting on the restriction members and the rotational center or shaft.

14. The gravity-assisted rotational mechanism as claimed in claim 11, wherein multiple rotational mechanisms each of which is composed of the rotational members and the link members are mounted on the rotational center or shaft.

15. The gravity-assisted rotational mechanism as claimed in claim 1, wherein the third rotational ring further has symmetrically oppositely outward extending connection plates, free ends of the connection plates being pivotally connected on the first rotational ring.

16. The gravity-assisted rotational mechanism as claimed in claim 15, wherein different sections of the link bars are respectively restricted within the first and second interference sections, restriction members being loosely fitted through the second interference sections and affixed to the link bars, elastic members being pivotally mounted between the restriction members and the rotational center or shaft, first ends and second ends of the elastic members respectively acting on the restriction members and the rotational center or shaft.

17. The gravity-assisted rotational mechanism as claimed in claim 15, wherein multiple rotational mechanisms each of which is composed of the rotational members and the link members are mounted on the rotational center or shaft.

18. The gravity-assisted rotational mechanism as claimed in claim 1, wherein push/pull sections are disposed on the third rotational ring and pivotal fitting sections are disposed on the rotational disc, whereby when the third rotational ring is assembled with the rotational disc, elastic members are mounted between the pivotal fitting sections and the push/pull sections.

19. The gravity-assisted rotational mechanism as claimed in claim 18, wherein different sections of the link bars are respectively restricted within the first and second interference sections, restriction members being loosely fitted through the second interference sections and affixed to the link bars, elastic members being pivotally mounted between the restriction members and the rotational center or shaft, first ends and second ends of the elastic members respectively acting on the restriction members and the rotational center or shaft.

20. The gravity-assisted rotational mechanism as claimed in claim 18, wherein multiple rotational mechanisms each of which is composed of the rotational members and the link members are mounted on the rotational center or shaft.

21. The gravity-assisted rotational mechanism as claimed in claim 1, wherein different sections of the link bars are respectively restricted within the first and second interference sections, restriction members being loosely fitted through the second interference sections and affixed to the link bars, elastic members being pivotally mounted between the restriction members and the rotational center or shaft, first ends and second ends of the elastic members respectively acting on the restriction members and the rotational center or shaft.

22. The gravity-assisted rotational mechanism as claimed in claim 21, wherein restriction members are fixedly fitted through the first interference sections, each elastic member having a rotary center, the rotary centers of the elastic members being fitted on the restriction members.

23. The gravity-assisted rotational mechanism as claimed in claim 1, wherein multiple rotational mechanisms each of which is composed of the rotational members and the link members are mounted on the rotational center or shaft.

24. A generator device cooperating with a gravity-assisted rotational novelty system, the gravity-assisted rotational mechanism including at least two concentric rotational members having different sizes and rotatable about the same rotational center or shaft, and at least one pair of link members connected between the above concentric rotational members, interference sections being at least disposed on a large-size rotational member and a small-size rotational member in rotational directions, the link members being restricted within the interference sections, the interference sections of the large-size rotational member serving to provide supporting force for the link members that rotate and descend, while the interference sections of the small-size rotational member serving to provide supporting force for the link members that rotate and ascend, the generator device being coupled with the rotational center or shaft;
    wherein the generator device comprises a coupling wheel mounted on the rotational center or shaft, the coupling wheel being couple with an actuation device and a generator.

25. The generator device cooperating with the gravity-assisted rotational mechanism as claimed in claim 24, wherein the rotational members include a first rotational ring, a second rotational ring, a third rotational ring and a rotational disc, which are concentric with decreasing sizes, each of the link members being composed of a link bar and a weight body connected with the link bar, the interference sections disposed on the first rotational ring being second interference sections, the interference sections disposed on the second rotational ring being first interference sections, the weight bodies being arranged around the first rotational ring, the link bars being formed with through holes near inner ends of the link bars for pivotally connecting the link bars with the rotational center or shaft, the link bars being further respectively formed with stabilization points for pivotally connecting with first pivot points of the rotational disc, the link bars being restricted within different interference sections of the rotational members.

26. The generator device cooperating with the gravity-assisted rotational mechanism as claimed in claim 25, wherein the inner ends of the link bars additionally have outward extending sections for pivotally connecting with the second rotational ring.

27. The generator device cooperating with the gravity-assisted rotational mechanism as claimed in claim 25, wherein the rotational disc is formed with a central hole in which the rotational center or shaft is drivingly fitted, the rotational disc, the third rotational ring and the second rotational ring being engaged with each other.

28. The generator device cooperating with the gravity-assisted rotational mechanism as claimed in claim 25, wherein the rotational disc has at least two symmetrically outward extending first guide plates, free ends of the first guide plates being pivotally connected on the second rotational ring.

29. The generator device cooperating with the gravity-assisted rotational mechanism as claimed in claim 25, wherein the third rotational ring has symmetrically oppositely outward extending second guide plates, free ends of the second guide plates being pivotally connected on the first rotational ring.

30. The generator device cooperating with the gravity-assisted rotational mechanism as claimed in claim 25, wherein the third rotational ring further has symmetrically oppositely outward extending connection plates, free ends of the connection plates being pivotally connected on the first rotational ring.

31. The generator device cooperating with the gravity-assisted rotational mechanism as claimed in claim 25, wherein push/pull sections are disposed on the third rotational ring and pivotal fitting sections are disposed on the rotational disc, whereby when the third rotational ring is assembled with the rotational disc, elastic members are mounted between the pivotal fitting sections and the push/pull sections.

32. The generator device cooperating with the gravity-assisted rotational mechanism as claimed in claim 25, wherein different sections of the link bars are respectively restricted within the first and second interference sections, restriction members being loosely fitted through the second interference sections and affixed to the link bars, elastic members being pivotally mounted between the restriction members and the rotational center or shaft, first ends and second ends of the elastic members respectively acting on the restrict ion members and the rotational center or shaft.

33. The generator device cooperating with the gravity-assisted rotational mechanism as claimed in claim 25, wherein an elastic member is pivotally mounted between the rotational disc and the third rotational ring, first end and second end of the elastic member respectively exerting push force onto the third rotational ring and the rotational disc.

34. The generator device cooperating with the gravity-assisted rotational mechanism as claimed in claim 25, wherein the generator is further coupled with an electrical control device, the electric control device being electrically connected to a power storage device.

35. The generator device cooperating with the gravity-assisted rotational mechanism as claimed in claim 24, wherein multiple rotational mechanisms each of which is composed of the rotational members and the link members are mounted on the rotational center or shaft.

36. The generator device cooperating with the gravity-assisted rotational mechanism as claimed in claim 24, wherein the generator is further coupled with an electrical control device, the electric control device being electrically connected to a power storage device.

37. The generator device cooperating with the gravity-assisted rotational mechanism as claimed in claim 36, wherein the electrical control device is further electrically connected to an electrical conversion device.

38. The generator device cooperating with the gravity-assisted rotational mechanism as claimed in claim 36, wherein the electrical control device is further electrically connected to the actuation device.

* * * * *